United States Patent [19]

Chanroo et al.

[11] Patent Number: 5,684,859
[45] Date of Patent: Nov. 4, 1997

[54] METHOD AND APPARATUS FOR DOWNLOADING LOCATION SPECIFIC INFORMATION TO SELECTIVE CALL RECEIVERS

[75] Inventors: Keith Anthony Chanroo, Boca Raton; Walter Lee Davis, Parkland, both of Fla.

[73] Assignee: Motorola, Inc., Schaumburg, Ill.

[21] Appl. No.: 432,549

[22] Filed: May 1, 1995

[51] Int. Cl.$^6$ .............................. H04M 11/00; H04Q 7/00; H04Q 9/00
[52] U.S. Cl. .............................. 379/58; 379/57; 379/59; 455/11.1; 455/33.1
[58] Field of Search .............................. 379/57, 58, 59; 455/13.1, 33.1, 33.2, 33.4, 11.1, 12.1

[56] References Cited

U.S. PATENT DOCUMENTS

| | | | |
|---|---|---|---|
| 4,178,476 | 12/1979 | Frost | 179/2 EC |
| 4,644,347 | 2/1987 | Lucas et al. | 340/825.44 |
| 5,065,423 | 11/1991 | Gaskill | 379/57 |
| 5,090,050 | 2/1992 | Heffernan | 379/60 |
| 5,111,197 | 5/1992 | Ichikawa | 340/825.44 |
| 5,117,449 | 5/1992 | Metroka et al. | 379/58 |
| 5,131,020 | 7/1992 | Liebesny et al. | 379/59 |
| 5,153,903 | 10/1992 | Eastmond et al. | 379/57 |
| 5,162,790 | 11/1992 | Jasinski | 340/825.44 |
| 5,166,973 | 11/1992 | Hoff | 379/57 |
| 5,175,758 | 12/1992 | Levanto et al. | 379/57 |
| 5,202,912 | 4/1993 | Breeden et al. | 379/57 |
| 5,307,400 | 4/1994 | Sawyer et al. | 379/59 |
| 5,392,451 | 2/1995 | Schwendeman et al. | 455/13.1 |
| 5,394,560 | 2/1995 | Kane | 379/57 |
| 5,398,280 | 3/1995 | MacConnell | 379/93 |
| 5,432,839 | 7/1995 | DeLuca | 455/11.1 |
| 5,451,839 | 9/1995 | Rappaport et al. | 379/59 |
| 5,546,444 | 8/1996 | Roach, Jr. et al. | 379/59 |
| 5,581,594 | 12/1996 | McAfee | 379/58 |
| 5,592,533 | 1/1997 | McHenry et al. | 379/58 |
| 5,603,091 | 2/1997 | Linquist et al. | 455/12.1 |

*Primary Examiner*—Curtis Kuntz
*Assistant Examiner*—Binh K. Tieu
*Attorney, Agent, or Firm*—Keith A. Chanroo; Philip P. Macnak

[57] ABSTRACT

A selective call system (100) has a plurality of base sites (120-124) for communicating with a plurality of selective call receivers (108) with acknowledge-back capability. A base site transmitter (210) transmits signals encoded with a stored location identifier (132), a base site receiver (241) receives acknowledge-back signals in response to the transmitted signals and a controller (206) determines when a selective call receiver (108) is authorized to receive location specific information (134). The base site transmitter (210) downloads the location specific information (134) to the selective call receiver (108) in response to verifying that the selective call receiver (108) is authorized. The selective call receiver (108) the signals having the location identifier (132) and the downloaded location specific information (134). A decoder/controller (306) compares the location identifier (132) received with the stored location identifier (132) of selective call receiver (108) to determine when the selective call receiver (108) has roamed to the new service area and stores the new location identifier (132). An acknowledge-back transmitter (334) transmits the new location identifier (132) to a home service area for enabling paging information to be routed from the home service area to the selective call receiver (108) at the new service area.

29 Claims, 11 Drawing Sheets

METHOD AND APPARATUS FOR DOWNLOADING LOCATION SPECIFIC INFORMATION TO SELECTIVE CALL RECEIVERS

FIELD OF THE INVENTION

This invention relates in general to communication systems, and in particular to a method and apparatus for downloading location specific information to a selective call receiver.

BACKGROUND OF THE INVENTION

Selective call (or paging) systems normally provide one-way radio frequency (RF) communication of selective call messages (pages) from a message originator to a selective call receiver. The message originator contacts the paging system via the public switched telephone network (PSTN) system or other input interface, and provides the message information to a paging controller. Typically, the message information is encoded into a conventional signaling protocol, modulated onto a carrier signal, and transmitted as an RF signal over a paging channel to the selective call receiver. The selective call receiver receives, demodulates, and decodes the signal to recover the message, and presents the message to a user of the selective call receiver.

Paging service providers that provide service to a large number of subscribers (paging or selective call receiver users) must utilize air time efficiently to cost effectively make the paging system commercially viable. Since paging system subscribers tend to be mobile and can roam over a wide geographic area, the paging services need to provide paging service that is seamless over the wide geographic area. However, a paging channel tends to limit the number of messages that can be transmitted therethrough because it has a limited bandwidth. Therefore, service providers wishing to service the ever increasing number of subscribers over the wide geographic area do so by segmenting the wide geographic coverage area into a plurality of smaller service areas for transmitting more pages thereinto in a parallel fashion to enhance overall system throughput. Unfortunately, segmenting the geographic regions narrows the coverage areas thereby exacerbating the delivery of pages to a roaming subscriber.

When a subscriber roams from service area-to-service area, the service provider has to be kept informed of such roaming to make sure that the pages designated to a roaming subscriber will reach the selective call receiver. Typically, this has been accomplished by requiring the subscriber to provide an itinerary and schedule to the service provider before departing on a trip. The service provider would manually configure a paging system subscriber database to send pages destined for the roaming subscriber at the destination service area (or service areas) corresponding to the itinerary and schedule. Upon returning home from the trip, the subscriber again would contact the service provider to reconfigure the paging system subscriber database for sending pages destined to the subscriber at the home service area. This can be a laborious endeavor, and is subject to human error because the subscriber has to remember to contact the service providers, which tends to reduce the efficiency and accuracy of the paging system operations thereby adding operational costs and potentially frustrating customers who missed pages sent to incorrect destination service areas. Furthermore, irrespective of the geographic location of a subscriber, it is desirable, along with sending paging messages, to send other information that are associated with subscribers operation in the new geographic area.

Thus, what is needed is a wide area selective call system that can provide paging information and other important information to roaming subscribers in a convenient and efficient manner to make the change of geographic area as transparent as possible.

DETAILED DESCRIPTION OF THE INVENTION

Figure 1:
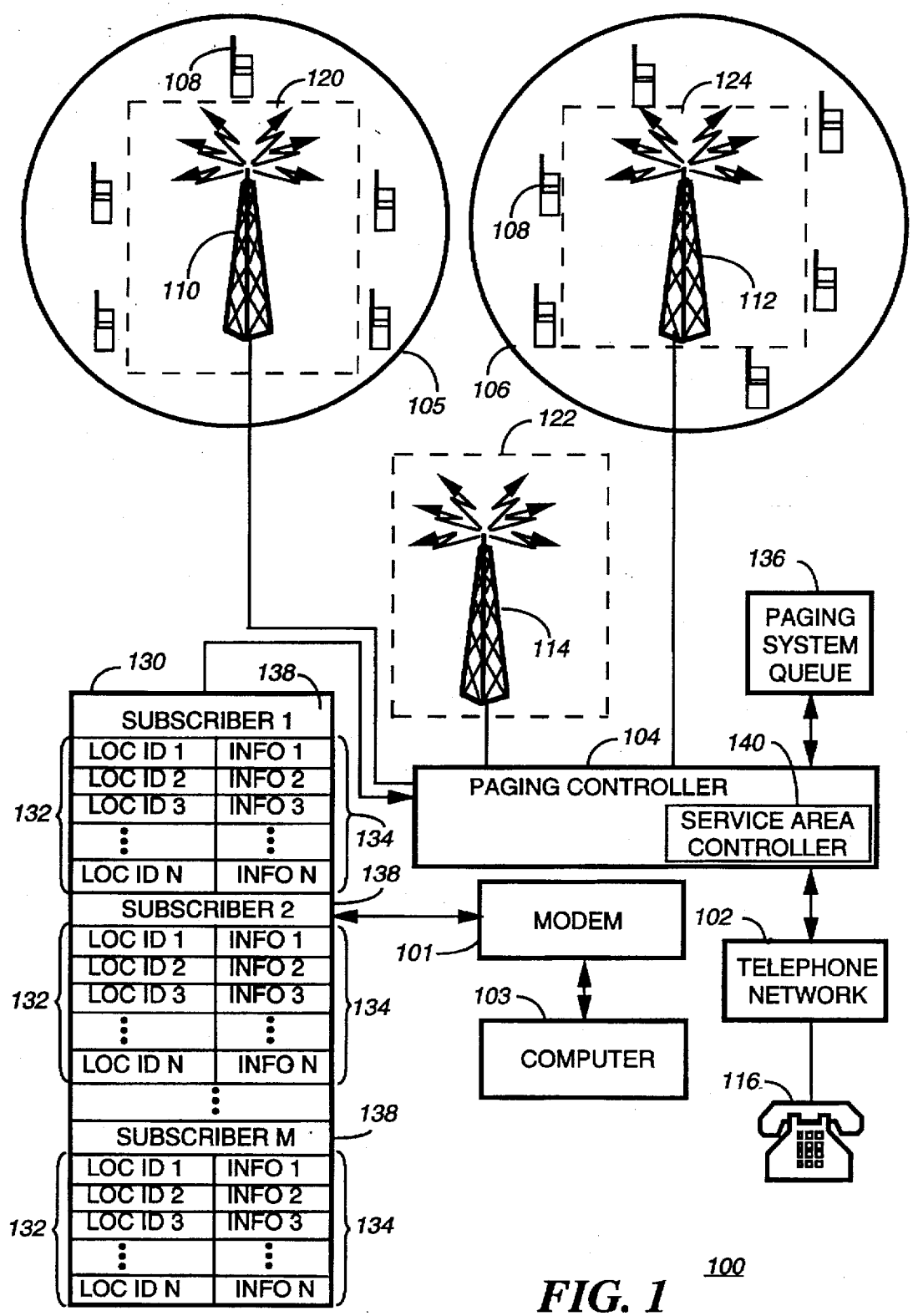
FIG. 1 is an electrical block diagram of a selective call system in accordance with a preferred embodiment of the present invention.

Referring to FIG. 1, a selective call system 100 in accordance with a preferred embodiment of the present invention is shown. The selective call system 100 comprises a paging (or terminal) controller 104 coupled to a telephone network 102 and a plurality of base sites 120–124, each having an associated geographic areas (or coverage areas) 105–106. The paging controller 104 accesses a subscriber database 130 coupled thereto to obtain subscriber information 138 comprising a subscriber address, a location identifier 132 and location specific information 134. The subscriber information 138 is combined with other paging (selective call) information to form a page. AS an example, the subscriber database 130 is shown having a plurality of subscriber information 138 illustrating the location identifiers 132 preferably indicating, for example, the cities where a subscriber visits most frequently as illustrated as location identifiers (1–N). Location specific information 134 are associated with each location identifier 132 for the subscriber information 138. The location specific information 134 comprises general location specific information and subscriber location specific information. The general location specific information include, for example, telephone numbers of the local telephone directory, such as hotels, restaurants, theaters, taxis, and other general information relating to a particular city (geographic area or service area). The subscriber location specific information include, for example, telephone numbers of the subscriber's clients and other personal and confidential information that the subscriber may need while in a particular city (geographic area). Each location identifier (LOC ID 1–N) 132 identifies a city, service area, or geographic area and the corresponding information (INFO 1–N) associated therewith. For example, the subscriber database 130 illustrates 1-to-M number of subscribers, each subscriber capable of operating in 1-to-N service areas. At the 1-to-N service areas, there are stored location specific information associated with the 1-to-N subscribers.

For example, when a subscriber travels to another service area outside its home service area, his selective call receiver 108 will receive selective call signals from the paging controller 104 in the new service area. The selective call signals are encoded, by techniques well known to one of ordinary skilled in the art, with the location identifier (LOC ID) 132 of the new service area by a service area controller 140 of the paging controller 104. The pages are then stored in the paging system queue 136 before transmission. The selective call signals are retrieved sequentially from the paging system queue 136 by a retriever of the paging controller 104 and provided to transmitters 110–114 over a communication link, for example over telephone line, over radio frequency link, over microwave link, over satellite communication link, or a combination thereof. It is appreciated that the paging transmitters 110–114 may not be located proximate to the paging controller 104, and according to the preferred embodiment of the present invention, the paging transmitter(s) 110–114 are at different (or distant) geographic areas (or coverage areas). The service area controller 140 selects the destination paging transmitters 110–114 for coupling the pages thereto as indicated by the current service area information (the location identifier) 132 for the routing the pages.

The selective call receiver 108 decodes and compares the location identifier 132 with its home location identifier to determine when it has roamed to a new service area. The home location identifier 132 is preferably contained in a Read Only Memory (ROM)__to permanently store the home location identifier. The new location identifier 132 is stored in a Random Access Memory (RAM) that can be erased when the selective call receiver 108 receives another location identifier 132, i.e., when the selective call receiver has roamed to another service area. Preferably, the selective call receiver 108 is an acknowledge-back selective call receiver 108 that stores the new location identifier 132 and transmits acknowledge-back signals to the base sites 120–124 of new service area to initiate log-in. The terminal controller 104, upon receipt of the acknowledge-back signal, checks if the selective call receiver 108 is authorized to receive location specific information 134. Preferably, the general location specific information is stored at a base site or terminal controller of each service area to which the information pertains and subscriber location specific information is stored at the home service area of each subscriber. Alternatively, both the general and the subscriber location specific information may be stored at the new service area or at the home service area without departing from the scope of the invention. When the terminal/controller 104 determines that the selective call receiver 108 is authorized, the location specific information 134, preferably, the general location specific information is downloaded to the selective call receiver 108 which receives and stores the location specific information to operate more efficiently in the new service area. Similarly, the selective call receiver 108 transmits, via the new service area to the home service area, acknowledge-back signal encoded with the new location identifier 132. When the paging controller 104, at the home service area, receives and decodes the new location identifier 132, it is stored and used to route future pages to the selective call receiver 108 at the new service area. The paging controller 104, at the home service area, also checks its subscriber database 130 to determine if there are any location specific information 134, preferably subscriber location specific information, corresponding to the received new location identifier. If so, the location specific information 134 is retrieved and forwarded to the new service area to be downloaded to the selective call receiver 108.

A computer 103 and a modem 101 are shown coupled to the subscriber database 103 to provide an input to the location identifier (1–N) 132 for subscribers (1–M) 138. The location identifier (1–N) 132 have corresponding location specific information (1–N) 134 stored therewith. In particularly, a subscriber can tailor his subscriber database 130 to include only the specific cities and information as needed by the subscriber. Similarly, the subscriber can be provided with, for example, an access code for modifying or for changing the information stored in the subscriber database 130.

In this way, a selective call receiver with acknowledge-back capability is able to roam in a wide area while still being able to receive pages and information pertaining to the service area to which the selective call receiver has roamed without any input from the user or without providing a travel itinerary. When the selective call receiver receives a new location identifier, the selective call receiver sends the location identifier to its home service area so that all paging information can be routed to the new service area indicated by the location identifier. The paging controller of the new service area also determines if the selective call receiver is authorized to receive the location specific information in the service area. The location specific information is downloaded to the selective call receiver when it is authorized. Also, when the home service area receives the new location identifier, it checks if there are any location specific information which is downloaded to the selective call receiver.

Figure 2:
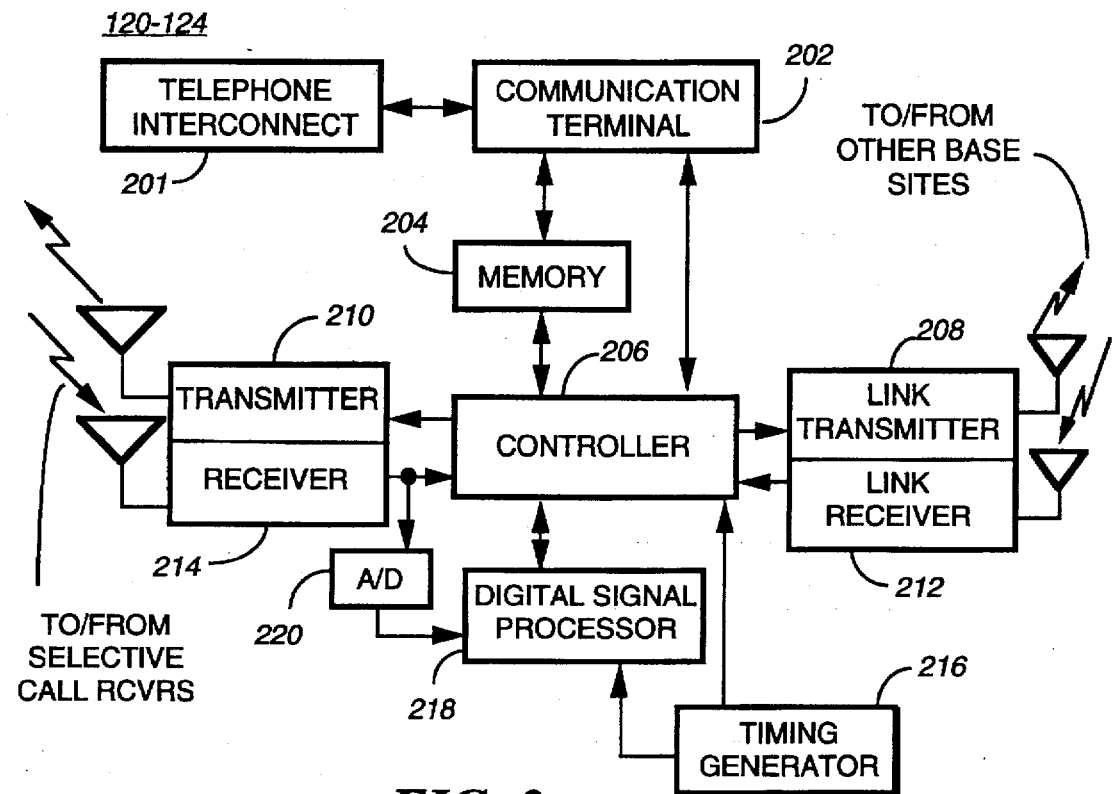
FIG. 2 is an electrical block diagram of a base station in accordance with the preferred embodiment of the present invention.

Referring to FIG. 2, a more detailed block diagram of the base sites 120–124 is shown in accordance with the preferred embodiment of the present invention. The base stations 120–124 comprise a telephone interconnect 201 which allows messages to enter into the selective call system 100 through a public or private telephone network using, for example, a telephone 116 (FIG. 1), a computer 103, or an alphanumeric entry device (not shown). A communication terminal 202, for example the Motorola's MODEN PLUS Encoder, processes the information received through the telephone interconnect 201. A generated address and message decoded from the received information are stored in a memory 204 until the next transmission cycle.

As shown, the communication terminal 202 is coupled to a controller 206, which controls the operation of a link transmitter 208, a base site transmitter 210, a base site receiver 212, and a receiver 214. An example of a controller suitable for use in the present invention is Motorola's MC6809 controller. A timing generator 216, coupled to the controller 206, provides a high accuracy clock to maintain system timing for communication and synchronization of the selective call system 100 including all the selective call base sites 120–124 and the plurality of selective call receiver 108 by techniques known to one skilled in the arts. Operationally, the base site transmitter 210 transmits, to the plurality of selective call receivers 108, at least one of which has acknowledge-back capabilities, a signal which comprises a paging (selective call) type message preferably on a first frequency at the transmission cycle. As is known, the paging message, before it is transmitted, is encoded with the appropriate address for addressing the intended selective call receiver of the plurality of selective call receivers 108. For example, when one of the plurality of the selective call receivers 108 has been paged, the selective call receiver that received the message will transmit a response, the acknowledge back signal. Preferably, the acknowledge back (acknowledgment or ack-back) signal is transmitted on a second frequency to maximize the throughput of the paging channel. The receiver 214 of the selective call base sites 120–124 receives the acknowledge back response (ack signal or ack-back signal) which is stored in a memory 204. As is well known, the receiver 214 demodulates the ack-back signal to produce preferably a baseband signal. The baseband signal is converted (digitized) from an analog signal to a digital signal by an analog-to-digital (A/D) converter 220 known to one of ordinary skill in the art. The conversion by the A/D converter 220 are received and stored by a digital Signal Processor (DSP) 218. The DSP 218, for example, can include a Motorola's DSP56100 or a Texas Instrument's TMS3000 series digital signal processors. According to the preferred embodiment of the present invention, the DSP 218 stores the digitized samples as digitized bits and continuously receives and stores the digitized samples until all bits of the ack-back signal have been received and stored. The digitized samples are retrieved and each bit decoded. Upon the completion of the decoding of the ack-back signal, the DSP determines whether the selective call receiver is authorized to receive downloaded information.

Figure 3:
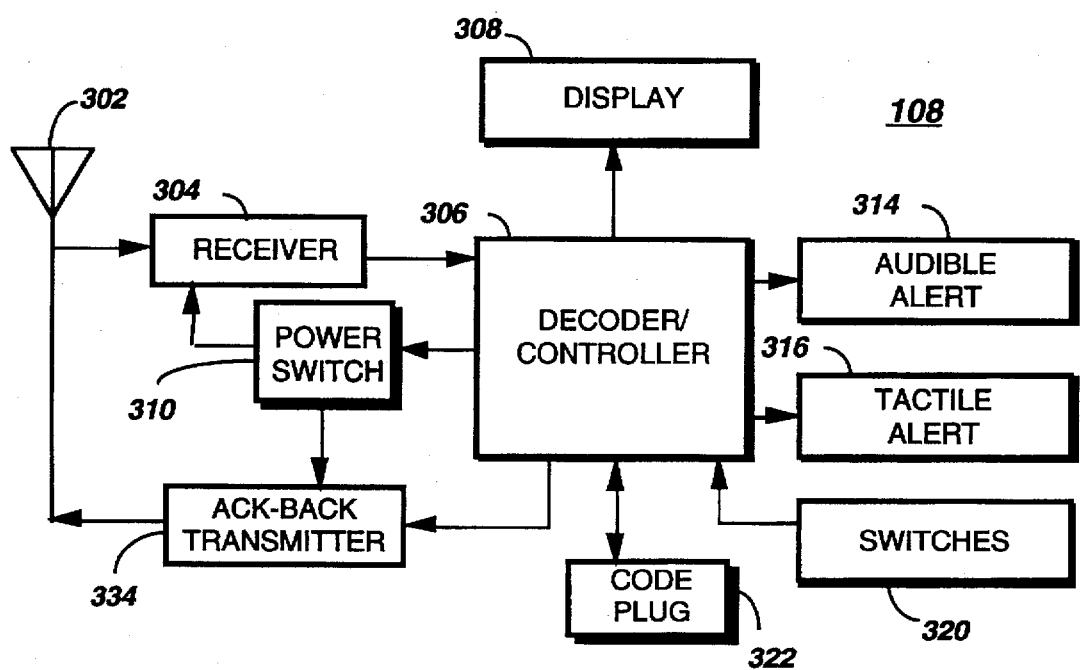
FIG. 3 is an electrical block diagram of a selective call receiver having acknowledge-back capability in accordance with the preferred embodiment of the present invention.

Referring to FIG. 3, an electrical block diagram of a selective call receiver 108 is shown in accordance with the preferred embodiment of the present invention. The selective call receiver 108 comprises an antenna 302 for intercepting transmitted radio frequency (RF) signals which are coupled to the input of a receiver 304. The RF signals are preferably selective call (paging) message signals which provide, for example, a receiver address, location identifier 132 and an associated message, such as voice message. However, it will be appreciated that other well known paging signaling formats, such as tone only signaling or tone, numeric or alphanumeric signaling, would be suitable for use as well. The receiver 304 processes the RF signal and produces at the output a data stream representative of a demodulated data information. The demodulated data information is coupled into the input of a decoder/controller 306 which processes the information in a manner well known in the art. An ack-back transmitter 334 is coupled to the antenna 302 and the decoder/controller 306. A power switch 310, coupled to the decoder/controller 306, is used to control the supply of power to the receiver 304, thereby providing a battery saving function, and to the transmitter 334 for transmitting the ack-back in response to the receipt of a paging message.

For purposes of this illustration, it will be assumed that the protocol is the FLEX™ signaling format although other signaling formats could be utilized as well. When the address is received by the decoder/controller 306, the received address is compared with one or more addresses stored in a codeplug (memory) 322, and when a match is detected, an alert signal is generated to alert a user that a selective call message, or page, has been received. The alert signal is directed to an audible alerting device 314 for generating an audible alert or to a tactile alerting device 316 for generating a silent vibrating alert. Switches 320 allow the user of the selective call receiver to, among other things, select between the audible alert 314 and the tactile alert 316 in a manner well known in the art.

The message information which is subsequently received is stored in memory 404 (FIG. 4) and can be accessed by the user for display using one or more of the switches 320 which provide such additional functions as reset, read, and delete, etc. Specifically, by the use of appropriate functions provided by the switches 320, the stored message is recovered from memory and processed by the decoder/controller 306 for displaying on a display 308 which enables the user to view the message. The receipt of the message by the selective call receiver 108 can automatically generate the ack-back response to the selective call base station to inform it that the message was successfully received. Preferably, the decoder/controller 306 decodes when a new location identifier 132 is received. The decoder controller stores the new location identifier 132 in memory 404 and the ack-back transmitter transmits an ack-back signal to the paging controller of the new service area to initiate log-in. The ack-back signal is forward to the home service area encoded with the new location identifier 132. The base sites at home service area thereafter are able to retransmit all pages to the selective call receiver 108 at the new service area. The paging controller at the home service area also checks and transmits any location specific information corresponding to the new location identifier.

Figure 4:
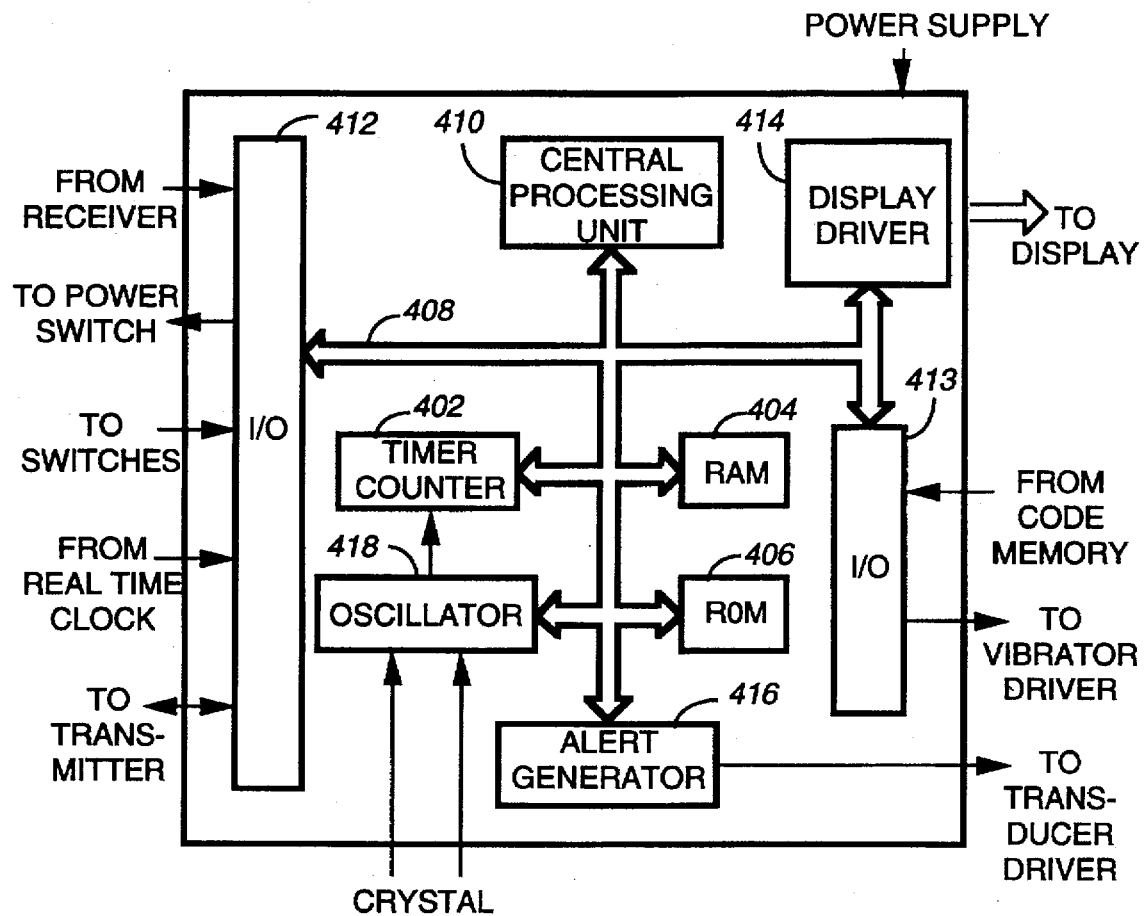
FIG. 4 is an electrical block diagram of a microcomputer based decoder/controller suitable for use in the selective call receiver of FIG. 3.

The controller/decoder 306 of FIG. 3 can be implemented utilizing a microcomputer as shown in FIG. 4. FIG. 4 is an electrical block diagram of a microcomputer based decoder/controller suitable for use in the selective call receiver of FIG. 3. As shown, the microcomputer 306 preferably comprises a series microcomputers, such as manufactured by Motorola, Inc., which includes an on-board display driver 414. The microcomputer 306 includes an oscillator 418 which generates the timing signals utilized in the operation of the microcomputer 306. A crystal, or crystal oscillator (not shown) is coupled to the inputs of the oscillator 418 to provide a reference signal for establishing the microcomputer timing. A timer/counter 402 couples to the oscillator 418 and provides programmable timing functions which are utilized in controlling the operation of the receiver or the processor. A RAM (random access memory) 404 is utilized to store variables derived during processing, as well as to provide storage of message information and the new location identifier which are received during operation as the selective call receiver. A ROM (read only memory) 406 stores the subroutines including the home location identifier which control the operation of the receiver or the processor which will be discussed further. It will be appreciated that in many microcomputer implementations, the programmable-ROM (PROM) memory area can be provided either by a programmable read only memory (PROM) or an EEPROM (electrically erasable programmable read only memory) which stores the home location identifier 132. The oscillator 418, timer/counter 402, RAM 404, and ROM 406 are coupled through an address/data/control bus 408 to a central processing unit (CPU) 410 which performs the instructions and controls the operations of the microcomputer 306 according to the location identifier 132.

The demodulated data generated by the receiver is coupled into the microcomputer 306 through an input/output (I/O) port 412. The demodulated data is processed by the CPU 410, and when the received address is the same as stored within the code-plug memory which couples into the microcomputer through, for example an I/O port 413, the message, if any, and a new location identifier 132 are received and stored in RAM 404. Recovery of the stored message and selection of the predetermined destination address are provided by the switches which are coupled to the I/O port 412. The microcomputer 306 then recovers the stored message and directs the information over the data bus 408 to the display driver 414 which processes the information and formats the information for presentation by a display 308 (FIG. 3) such as an LCD (liquid crystal display). At the time a selective call receiver's address is received, the alert signal is generated which can be routed through the data bus 408 to an alert generator 416 that generates the alert enable signal which is coupled to the audible alert device that was described above. Alternatively, when the vibrator alert is selected, as described above, the microcomputer generates an alert enable signal which is coupled through data bus 408 to the I/O port 412 to enable generation of a vibratory, or silent alert. Switch inputs are received by the I/O port 412 via the data bus 408. The switch inputs are processed by the CPU 410. Specifically, the CPU 410 retrieves the address of the selective call base station from RAM 404 and in conjunction with the timer counter 402 and the oscillator 418, the CPU 410 generates the ack-back signal which is passed via the data bus 408 to the transmitter.

The battery saver operation is controlled by the CPU 410 with battery saving signals which are directed over the data bus 408 to the I/O port 412 which couples to the power switch 310. Power is periodically supplied to the receiver to enable decoding of the received selective call receiver address signals and any message information which is directed to the selective call receiver. Specifically, when the selective call receiver 108 begins decoding the paging signal, the receiver is powered by the power switch. When the paging message is received and stored, the microcomputer 306 sends a signal to the power switch 310 to disable power to the receiver 304 and enable power to the transmitter for transmitting the ack-back signal encoded with the location identifier 132.

Figure 5:
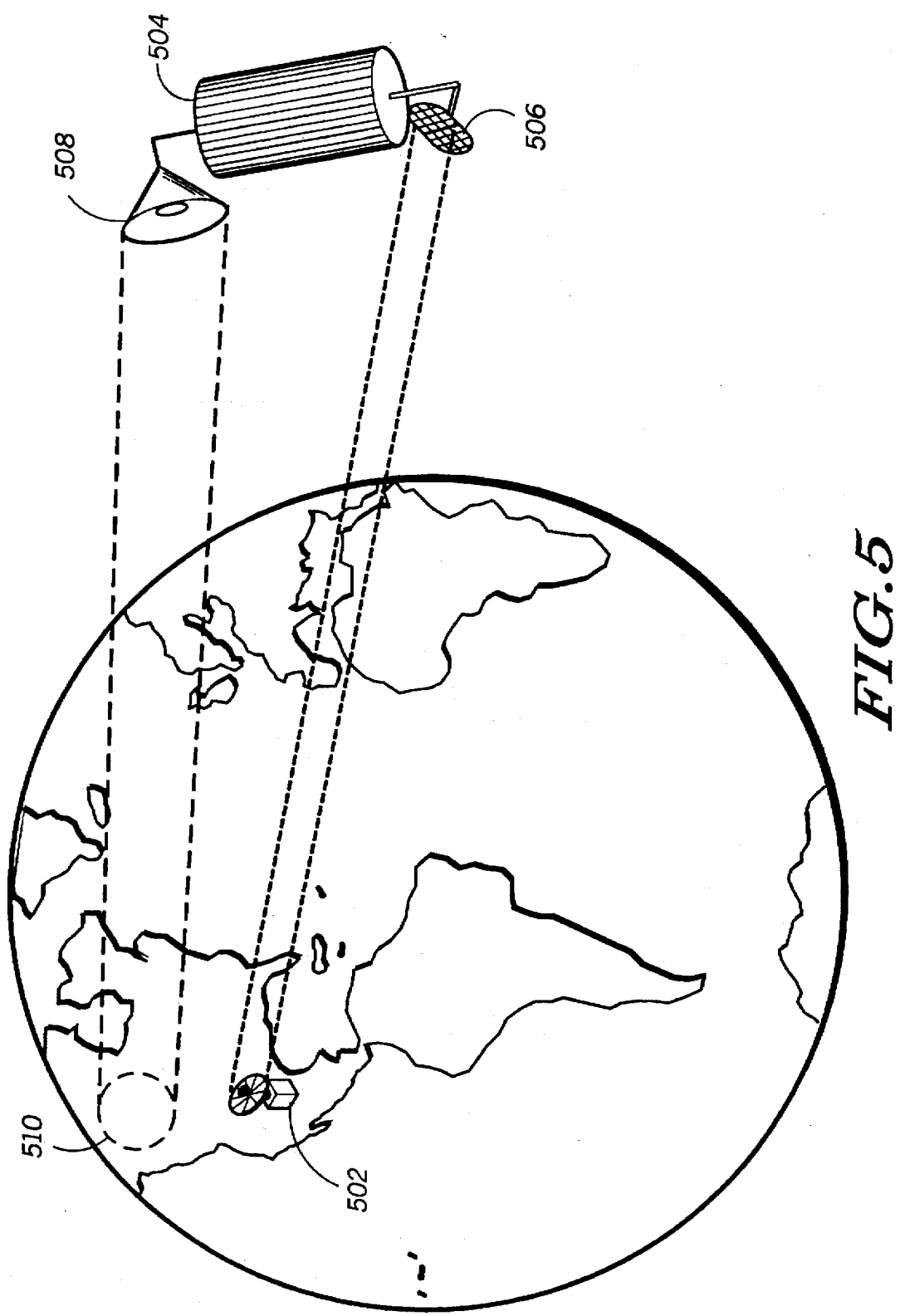
FIGS. 5 and 6 are illustrations of a wide geographic area selective call system in accordance with the preferred embodiment of the present invention.
Figure 6:
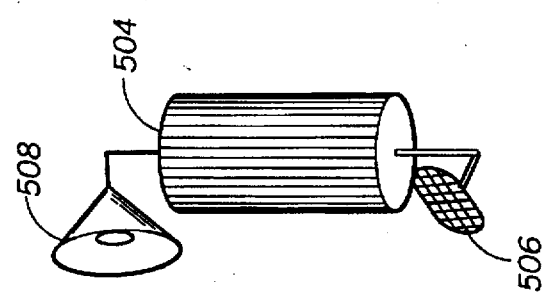
Figure 6:
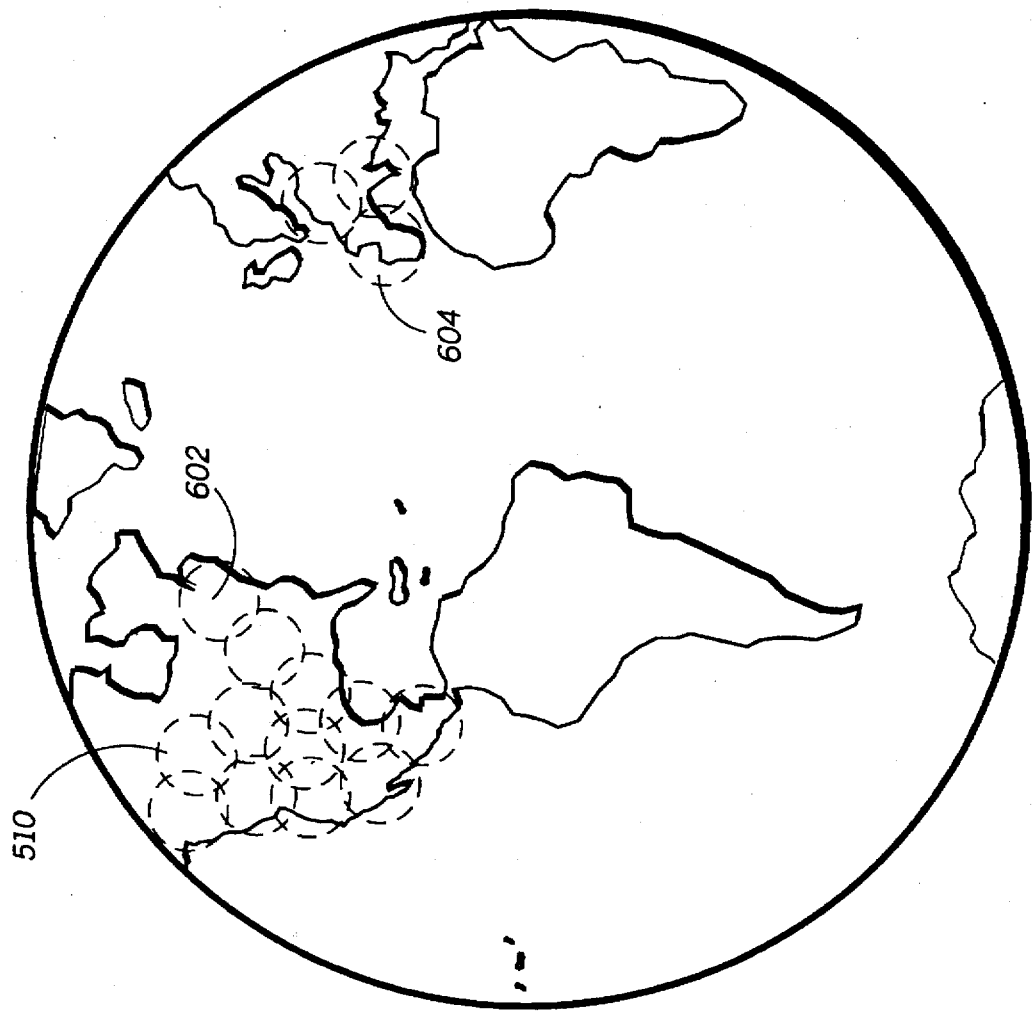

FIGS. 5 and 6 are illustrations of wide geographic area paging systems. Specifically, FIG. 5 illustrates a paging system service area (geographic location) paging system 502 capable of transmitting pages to a satellite transceiver 504. The satellite transceiver 504 comprises a satellite receiver 506 for receiving pages which can be processed by the satellite transceiver 504 before being transmitted by a satellite transmitter 508 in another service area in a different service area 510. FIG. 6 similarly illustrates the satellite transceiver 504 having receiver 506 and transmitter 508 which couple different geographic coverage areas irrespective of their relative locations. For example, the satellite transceiver 504 couples geographic coverage area 510 with geographic coverage area 602, both located on the same continent; and couples geographic coverage area 510 with geographic coverage area 604, both located on different continents. In this way, the selective call receivers 108 are able to roam all over the world while still receiving pages and location specific information without any actions from the subscribers of these roaming selective call receiver 108.

Figure 7:
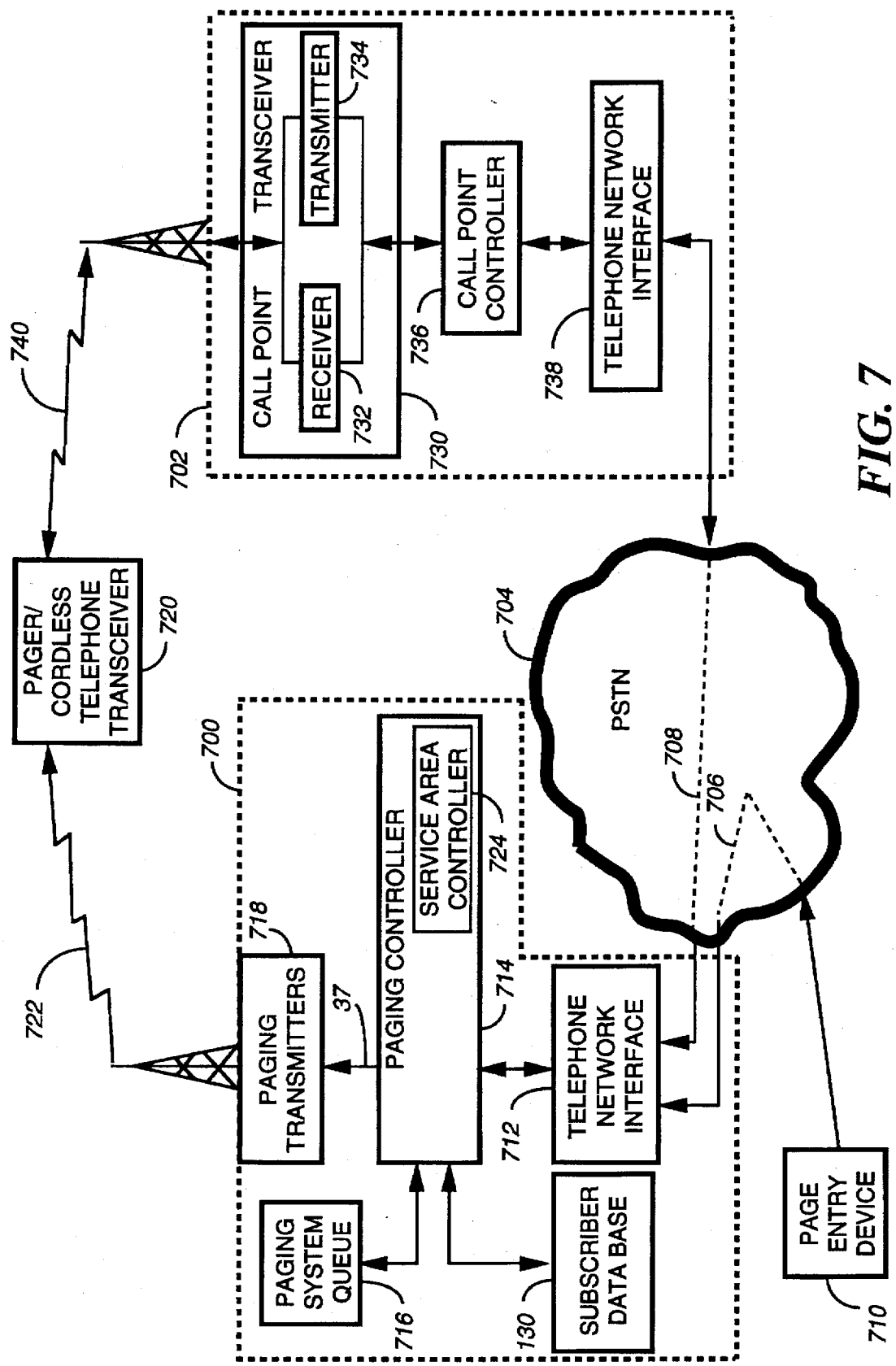
FIG. 7 is a diagram of a combination selective call system and cordless telephone system in accordance with a second embodiment of the present invention.

Referring to FIG. 7, a selective call signaling (paging) system combining communication across a first communication path 722 at a first data rate, for example to a wide area paging system 700, and a second communication path 740 at a second data rate, for example to a second generation cordless telephone (CT-2) system 702. The selective call signaling system uses a public switched telephone network (PSTN) 704 for communication therebetween. A message originator utilizes a page entry device 710 to enter paging information via the PSTN 704 for transmission to a subscriber of the paging system 700.

Typically, the page entry device 710 is a telephone for entry of voice or numeric information. The page entry device 710 could also comprise a data processing device, for example a page entry terminal or computer terminal, for generation of the paging information comprising graphics, facsimile or alphanumeric information.

The originator composes the message to be provided as the paging information on a computer terminal, and by placing a call via a modem or other device via a system access number of the paging system 700, the originator couples the page entry device 710 to a telephone network interface 712 of the paging system 700 via PSTN path 706. The paging information is then transported from the page entry device 710 to the telephone network interface 712 and then to a paging controller 714 for processing similar to the selective call system of FIG. 1. The paging controller 714 operates similar to the selective call system of FIG. 1 to access the subscriber database 130 for retrieving location specific information corresponding to the location identifier.

A wide area paging system typically includes a plurality of paging transmitters 718 which can transmit the selective call signals over a plurality of paging coverage areas to increase the probability of message reception by a roaming paging receiver/cordless telephone 720. In a first alternative approach, a plurality of the paging coverage areas are at least partially overlapping and are covered by simulcasting paging transmitters which are synchronized to transmit pages in the overlapping coverage areas. The plurality of overlapping paging coverage areas which are covered by simulcasting paging transmitters are considered as one service area. In a second alternative approach, a plurality of paging coverage areas are non-overlapping and are covered by individual non-simulcasting paging transmitters. Each non-overlapping paging coverage area is considered as a separate service area. In a third approach, a combination of overlapping and non-overlapping paging coverage areas are utilized to effectively cover a geographic area to increase the probability of message reception by roaming transceivers 720. Here, each non-overlapping paging coverage area is considered as a separate service area; and a plurality of overlapping paging coverage areas are considered as a single service area, where both types topologies exist in a wide area paging system, the geographic area or service area is more effectively covered.

In the alternative embodiment of the present invention, the selective call signals 722 transmitted from the paging system 700 are received by a transceiver 720 which preferably comprises a combination selective call receiver (pager) and cordless telephone. The pager portion of the combination selective call receiver/cordless telephone transceiver 720 receives the selective call signals while the cordless telephone transceiver portion, for example a second generation cordless telephone (CT-2) transceiver, can couple to the PSTN 704 via the cordless telephone system 702 for receiving and transmitting cordless telephone signals.

In accordance with the present invention, the paging controller 714 processes a page request from a caller and generates a page therefrom. Subsequently, the paging controller 714 transmits the page via the paging transmitters 718 to a portable communicator 740 or the pager/cordless telephone transceiver 720. The service areas (comprising a plurality of paging coverage areas) over which the page is transmitted are determined by the service area controller 724 from the current service area information for the pager/cordless telephone transceiver 720. These service areas correspond to the service areas in which a roaming pager/cordless telephone transceiver 720 is actually located in.

In one aspect of the present invention, the paging system 700 periodically transmits its unique service area (location) identifier over the service areas or geographic locations. The location identifier identifies to the receiving pager/cordless telephone transceivers 720 the service area (geographic location) in which they are currently receiving pages. Therefore, when the pager/cordless telephone transceiver 720 receives the location identifier, it can determine therefrom that it has roamed to another service area when the new location identifier is different from the "home" service area's location identifier. The "home" service area of the pager/cordless telephone 720 is the service area assigned to the pager/cordless telephone 720 when it is not roaming. It is also well to those of ordinary skill in the art that the paging systems in different service areas may operate on different frequencies that can be received by the selective call receivers or pager/cordless telephone by scanning through the plurality of frequencies to select a desired frequency.

Upon receipt of a signal indicating a different location identifier, the pager portion determines if the location is different from its "home" service area, when it is, the new location identifier is stored and the pager portion transmits its address or identifier to the paging system. The paging system of the new service area determines if the pager/cordless telephone is authorized to receive location specific information. Preferably, the paging system at the new service area stores a list of a plurality of pagers/cordless telephone or selective call receivers that are authorized to received the location specific information. Therefore, when the paging system receives a response from a pager/cordless telephone, the paging system compares the identifier/address of the response of the pager/cordless telephone with the list to determine if the pager/cordless telephone is authorized. When the paging system 700 of the new service area determines that the pager/cordless telephone 720 is authorized to receive location specific information, the location specific information is downloaded to the pager/cordless telephone 720 as discussed above.

The cordless telephone transceiver is also instructed to inform the "home" service area of the new location of the pager/cordless telephone transceiver 720 was received. The cordless telephone transceiver informs the home service area by coupling to the nearest cordless telephone call point station of the cordless telephone system 702 by signaling a call point transceiver 730 which comprising a receiver 732 and a transmitter 734. Once coupled thereto, the pager/cordless telephone 720 transmits the location identifier via the call point controller 736 which couples to the PSTN 704 via a telephone network interface 738 to the "home" service area's paging system 700 via path 708 to the "home" service coverage area.

Once the call point controller 736 calls up the "home" paging controller 714, the location identifier is retrieved and transmitted to the paging controller 714 of the "home" service coverage area so pages and location specific information as discussed above can be automatically routed to the new service area currently serving the pager/cordless telephone 720.

Figure 8:
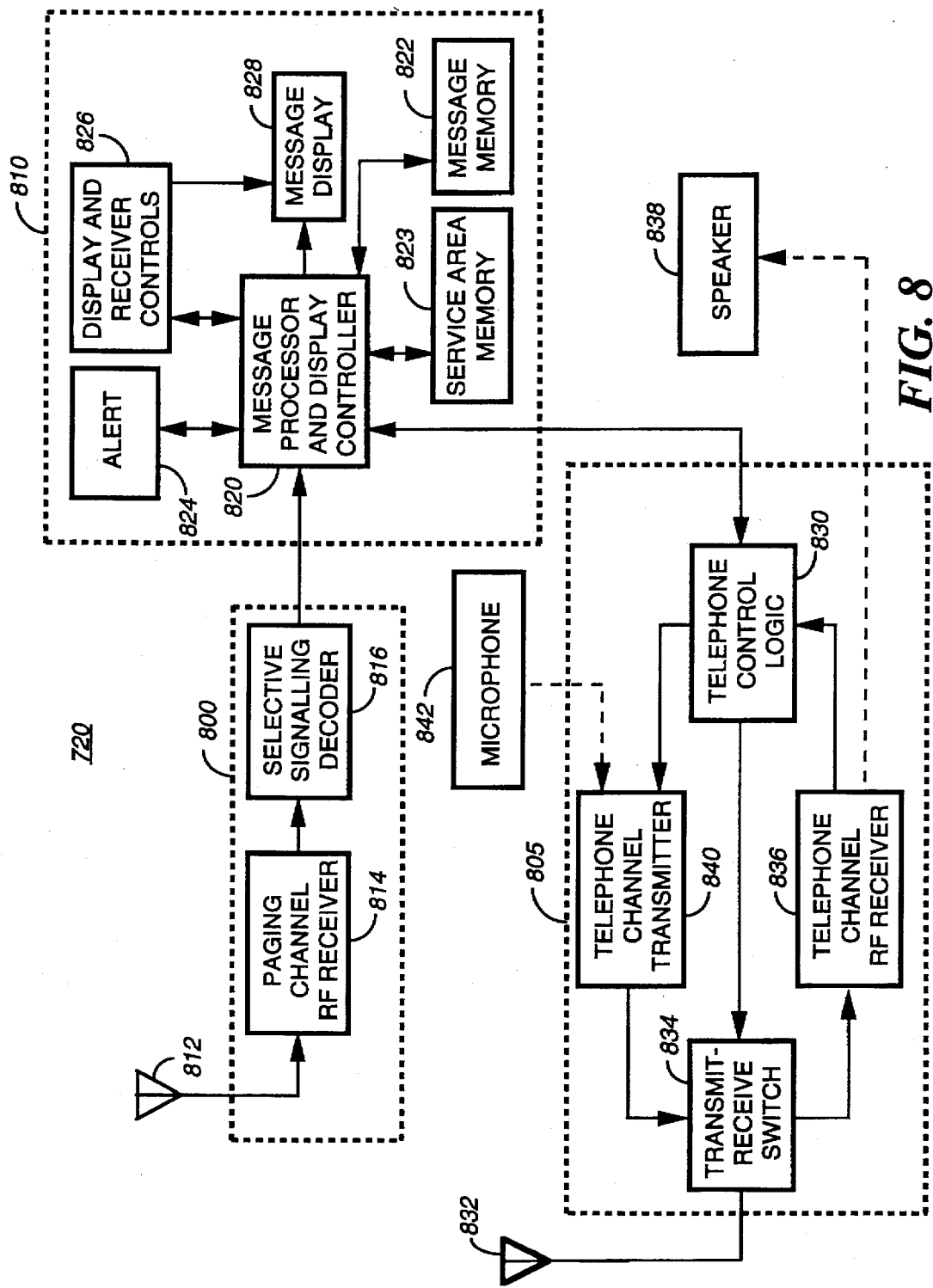
FIG. 8 is a block diagram of the combination selective call receiver and cordless telephone transceiver in accordance with the second embodiment of the present invention.

Referring to FIG. 8, the combination pager and cordless telephone transceiver 720 according to the preferred embodiment of the present invention is shown. The combination pager and cordless telephone transceiver 720 (or portable communicator 720) comprises a paging receiver section 800, a cordless telephone transceiver section 805, and a message and display controller section 810. The paging receiver section 800 includes an antenna 812 for receiving the selective call (paging) signals. A paging channel radio frequency (RF) receiver 814 coupled to the antenna 812 demodulates the selective call signals, and a selective signaling decoder 816 decodes the demodulated signal to recover the page and the location identifier transmitted therein.

The decoded page and the location identifier are provided to a message processor and display controller 820 for processing and decoding the location identifier encoded therewith. The decoded page is stored in a message memory 822 and the location identifier is stored in a service area memory 823 and the user (subscriber) is alerted via an alert device 824 that a page has been received. The user can activate user display controls 826 to retrieve the page from the message memory 822 and to display the page on a message display 828. The controls 826 can manipulate the message display 828 or alter receiving parameters in a manner well known to those skilled in the art.

Operation of the cordless telephone transceiver section 805 is controlled by a telephone control logic device 830. An antenna 832 is utilized for transceiving signals for conventional transceiver operation. The antenna 832 is coupled to a transmit-receive switch 834 which operates under the control of the telephone control logic 830. The transmit-receive switch 834, in one position, couples the antenna 832 to a telephone channel RF receiver 836 for processing received RF signals and providing the signals to the telephone control logic 830. In a second position, the transmit-receive switch 834 couples the antenna 832 to a telephone channel transmitter 840 which processes signals received from the telephone control logic 830 for transmittal as an RF (location update) signal from the antenna 832.

In an alternate embodiment, a speaker 838 can be coupled to the receiver 836 and a microphone 842 can be coupled to the transmitter 840 for conventional cordless telephone operation. In the alternative embodiment, the receiver 836 would provide audio portions of the signals to the speaker 838 and digital portions of the signals to the telephone control logic 830. The transmitter 840 would process audio signals received from the microphone 842 and digital signals received from the telephone control logic 830 for transmission from the antenna 832.

In accordance with the preferred embodiment of the present invention, when the message processor 820 determines that a new location identifier was received, the telephone control logic 830 is coupled to the message processor 820 for initiating the transmission of location update signals including the location identifier to the "home" service area. The message processor 820 stores the location identifier in a service area memory 823 and the telephone control logic 830 is signaled to call up the home paging controller 714 (FIG. 7) through transmission of the location update signals to a call point transceiver 730 (FIG. 7). Once the telephone control logic 830 is coupled to the paging controller 714, the location identifier is retrieved from the location update signals by the message processor 820 and transmitted under control of the telephone control logic 830. The telephone control logic 830 signals the transmit-receive switch 834 which enables the telephone channel transmitter 805 via the antenna 832 to send the location update signals having the location identifier to the "home" service coverage area at a second data rate. Specifically, the CT-2 telephone portion of the pager/cordless telephone 720 couples with the call point transceiver 730 and, as discussed in FIG. 7, the connection is made to the paging system 700 via the PSTN. Subsequent to the connection, the location identifier is then transmitted to the "home" service coverage area where the location identifier is stored in the "home" service area's database 130. Thereafter, home service area will retransmit all pages in the new service area and transfer the location specific information to be download to the pager/cordless telephone 720. Similarly, the new service area determines if the pager/cordless telephone 720 is authorized, and if so, downloads location specific information to the pager/cordless telephone 720.

In this way, when the "home" service area receives a page to be transmitted to the pager/cordless telephone 720 which is roaming in a different service coverage area (geographic location) of which the location identifier is known, the "home" service area reroutes the pages and downloads the location specific information to the pager/cordless telephone in the new service area. It is well known by one skilled in the art how to categorize and store information associated with a pager/cordless telephone 720, and how to reroute pages to be transmitted in different service areas. Preferably, the paging controller of the home service area generates a message routing request when a page is received addressed to a transceiver located in a new service area. Therefore, according to the preferred present invention present invention, the pager/cordless telephone 720, when it receives a different location identifier, knows that it is in a different service area. It then transmits the new location identifier to the "home" service area. The "home" service area stores the location identifier, and uses it to automatically reroute all pages and location specific information to that pager/cordless telephone 720 indicated by the location identifier. Also, the paging controller of new service area, when the pager/cordless telephone 720 is authorized, downloads location specific information to the pager/cordless telephone 720. It is understood by one of ordinary skilled in the art that the downloading of location specific information is preferably done initially when the selective call receiver or pager/cordless telephone has roamed to a new service area.

Figure 9:
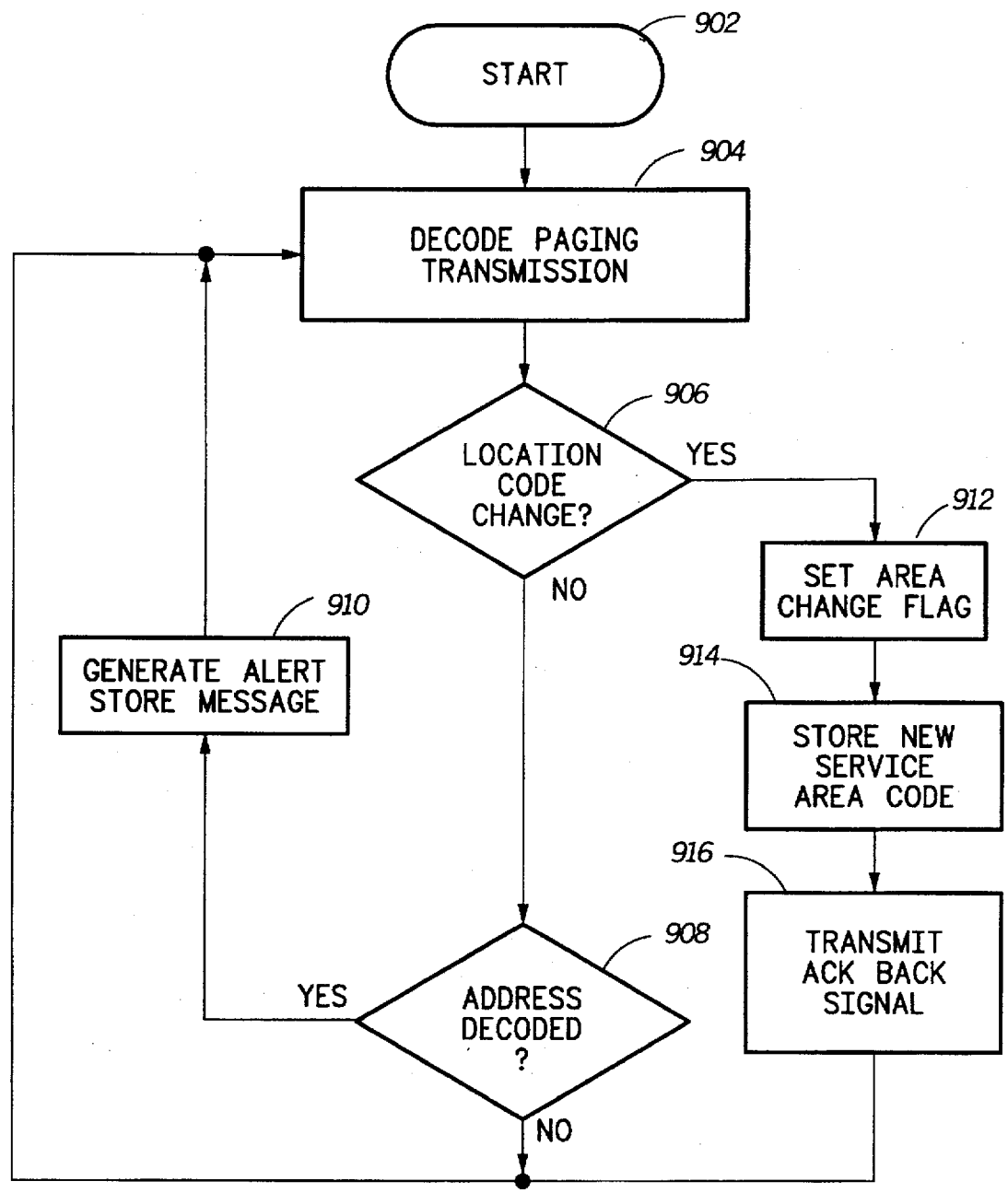
FIGS. 9 to 12 are flow diagrams illustrating operational sequences for selective call system FIGS. 1-3 and the combination paging system and cordless telephone system of FIGS. 7 and 8.

Referring to FIG. 9, a flow diagram of the operation of the selective call receiver 108 according to the preferred embodiment of the present invention is illustrated. After the startup 902, the selective call receiver begins to receive and decode a paging transmission including the location identifier 904. The location identifier indicates the service area of the paging system transmitting the paging signal, and a selective call receiver that receives a location identifier can determine if it has changed service area 906 by comparing its home location identifier with the received location identifier. In response to step 906, when a selective call receiver has received a new location identifier different from its "home" location identifier, the selective call receiver knows that it is roaming. The selective call receiver 108 sets an area change flag to indicate a new service area 912. The new service area identifier (location identifier) is then stored in the selective call receiver 914. Subsequent to storing the location identifier, the selective call receiver 108 transmits an ack-back signal encoded with its identifier and the new location identifier 132 to initiate log-in with the new paging system and receive downloaded location specific information.

Alternatively, in response to step 906, when the location identifier is the same, the pager proceeds in the conventional manner interrogating the paging signals to detect its address 908. When the selective call receiver has detected its address, the selective call receiver generates an alert and stores the message for retrieval by its user 910. However, when the selective call receiver fails to detect its address or after step 910, the selective call receiver continues to decode paging transmissions 904. In this way, the selective call receiver can automatically determine that it is roaming. The selective call receiver 108 informs its "home" service of its current location when the selective call receiver 108 has received a location identifier different from its "home" or different from any other location identifier previously received. Therefore, the selective call receiver, by setting a flag, indicates that the selective call receiver is roaming (away from its home service area), and substantially simultaneously, the selective call receiver activates the acknowledge-back transmitter to initiate call-in mode to log-in with the "home" service area that the selective call receiver 108 is located in the service area identified by the location identifier which is transmitted to the "home" paging system. The new service area determines if the selective call receiver 108 is authorized to received location specific information, and, if so, the location specific information is downloaded to the selective call receiver.

Figure 10:
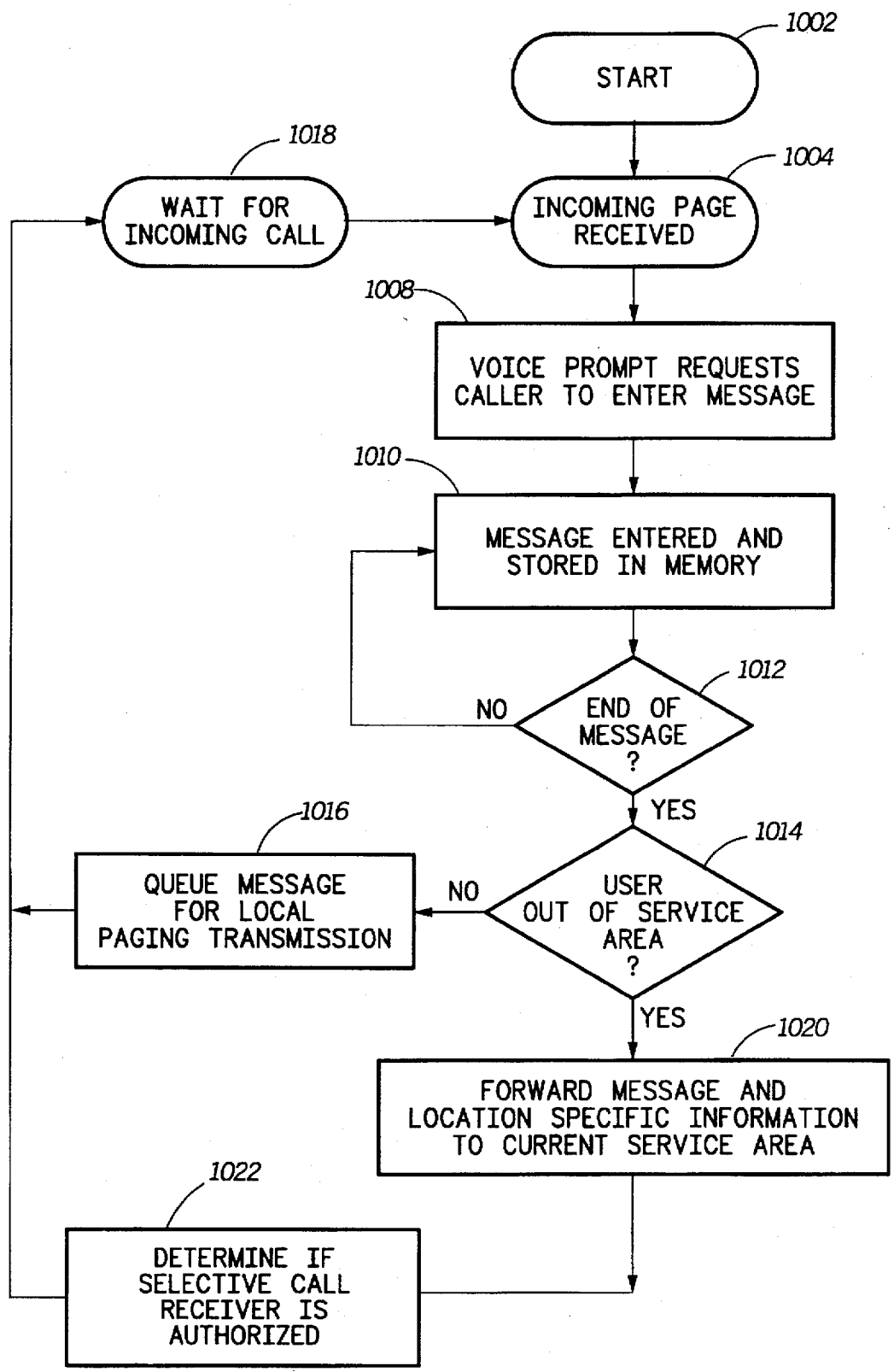

Referring next to FIG. 10, a flow diagram illustrating the message entry and message routing operations of the paging system in accordance with the preferred embodiment of the present invention. After startup 1002, the paging system receives incoming pages 1004. When an incoming call signal is received, the paging controller 104 generates a voice prompt 1008 requesting the caller (e.g., the message originator) to enter the message followed by an "end" signal. The "end" signal, as is well known, indicates the end of the message. The paging controller 104 continues to process and store the incoming message 1010 until the "end" signal is received 1012.

Next, the subscriber identification code (ID) and location identifier is recalled from the subscriber data base 130 (FIG. 1) 1014 for determining whether the selective call receiver 108 has roamed to another service area. The selective call receiver 108 informs the "home" service area that the selective call receiver 108 is located in another service area indicated by the transmitted location identifier. Therefore, when the paging system receives a page for a selective call receiver 108 determined to be located outside its "home" service area, the paging controller 104 calls the service area indicated by the location identifier and reroutes the page (message) to the other service area 1020 for transmission of the message to the selective call receiver 108. In step 1022, the paging controller 104 determines if the selective call receiver 108 is authorized to receive downloaded location specific information. The paging controller 104, for example, stores a list of authorized selective call receivers 108 and when the paging controller 104 receives the ack-back signal having the identifier of a selective call receiver 108 transmitting same, the paging controller 104 compares the identifier with the list to determine if the selective call receiver is authorized. The paging controller 104 knows the selective call receiver 108 is located outside its "home" service area because the selective call receiver 108 has previously informed the "home" paging system of its current geographic location. The paging controller 104 also downloads the location specific information corresponding to the new location identifier in the subscriber database 130. Preferably, by assigning each location identifier a telephone number of the geographic location of the paging system, each paging system, that has the information stored in memory, is able to determine the service area to reroute paging messages addressed to that selective call receiver. Therefore, by allocating each geographic location (service area) with unique location identifier, the home paging system is able to determine the service area of the selective call receiver that has logged-in with the new location identifier. The paging controller 104, upon receipt of the location identifier, stores the new location identifier. When it receives pages for that selective call receiver, the paging controller, retrieves the location identifier to determine the selective call receiver's 108 location, and reroutes the page and any location specific information to the geographic location identified by the location identifier. As is well known by one skilled in the art, the rerouting of page and information can be accomplished by a satellite or microwave links or any equivalent communication links suitable for such transfer.

However, when the location identifier is the same as the "home" service area 1014, the message is queued for local transmission 1016. Subsequent to steps 1020 and 1016, the process continues to wait for other incoming calls 1018. In this way, once the "home" service area is informed that a selective call receiver is roaming (by the receipt of another location identifier), the paging controller is able to automatically reroutes all paging messages and location specific information to the selective call receiver 108 that have logged the changed location identifier. The new service area also downloads the location specific information to the selective call receiver when it determines that the selective call receiver is authorized to receive it. According to this invention, the selective call receiver 108 can roam anywhere in the world, and still receive its pages and any location specific information relating to a new service area automatically when the selective call receiver informs the "home" paging system of a change in location identifier being received.

Figure 11:
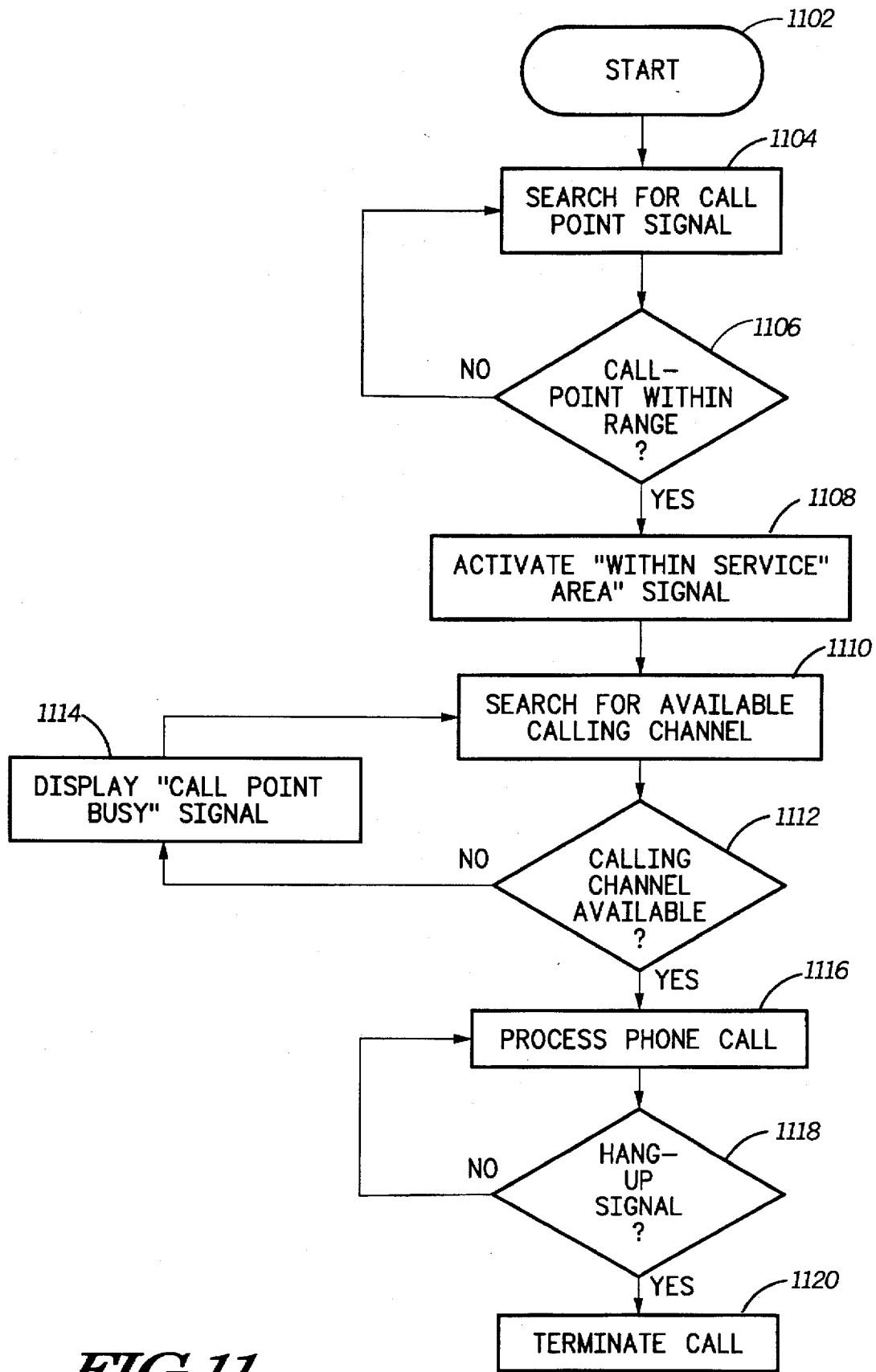

Referring next to FIG. 11, a flow diagram illustrating the call processing operation of the cordless telephone in accordance with the alternative embodiment of the present invention is shown. After startup 1102, the message processor 820, upon receipt of a new location identifier, activates the telephone control logic 830 to begin searching for a call point within range 1104. When the call point signal is detected, the cordless telephone determines, by conventional techniques, if the call point is within range 1106. If not, the cordless telephone continues searching for other call point signals 1104. However, when a call point is within range, the cordless telephone activates the "within service area" channel 1108 indicating that outgoing call can be initiated. Thereafter, a search for an available call channel begins 1110, and if none is available, the cordless phone displays "call point busy" signal 1114 and the search continue 1110.

However, when there is an available call channel 1112, the cordless telephone initiates and begins to process the telephone call 1116. The call processing continues until one side terminates the call which generates the hang-up signal 1118. Upon receipt of the hang-up signal, the call is terminated 1120.

Figure 12:
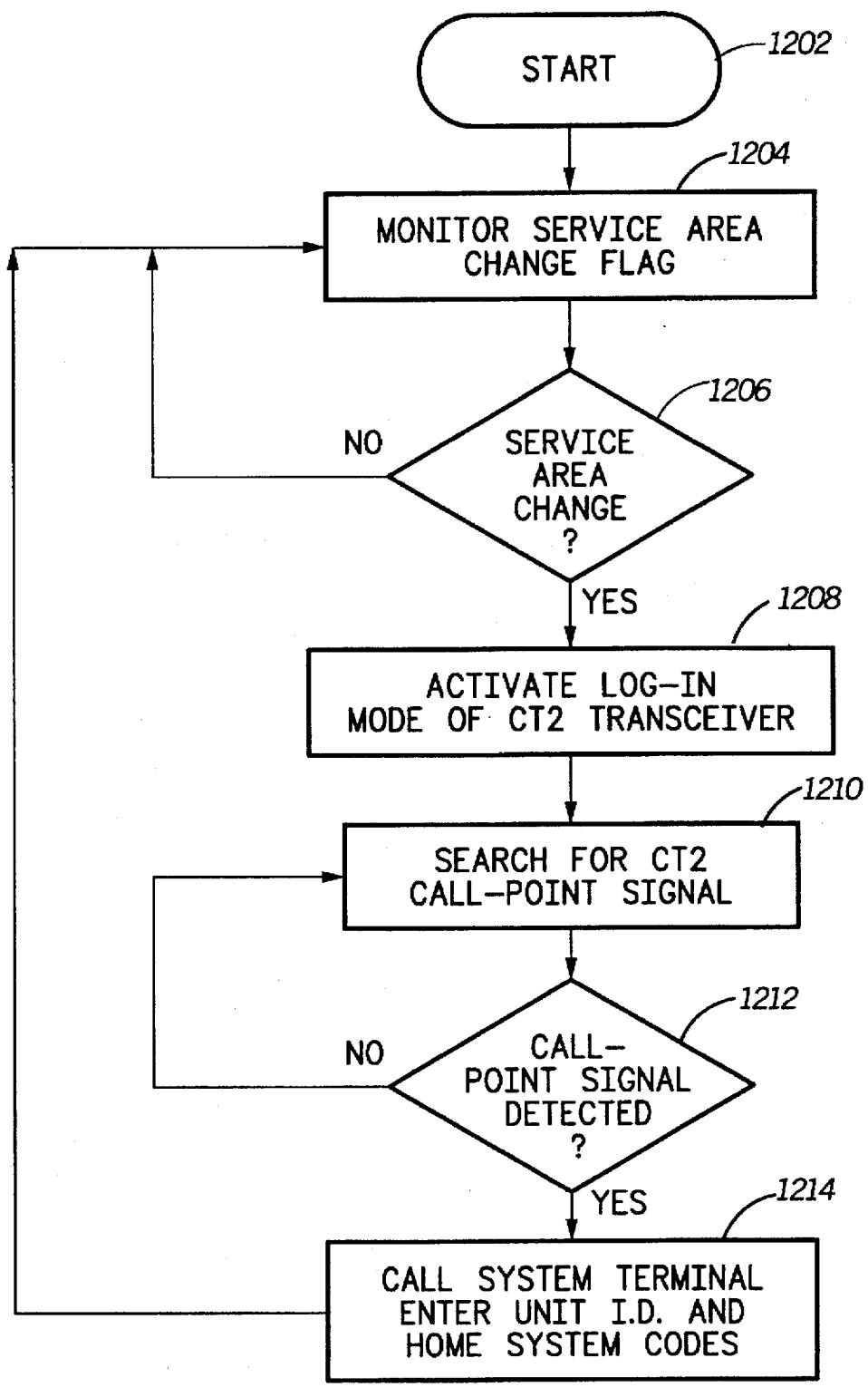

Referring to FIG. 12, a flow diagram illustrating the operation of the automatic log-in and downloading of the location specific information (database) operation of the pager/cordless telephone in accordance with the alternate embodiment of the present invention is shown. After startup 1202, the message processor 820 monitors the service area change flag of the pager/cordless telephone to determine when the pager/cordless telephone 720 has roamed to a new service area 1204. When cordless telephone 720 has determined that the location identifier has changed 1206, the cordless telephone portion activates the log-in mode of the cordless telephone 1208. The cordless telephone generates an automatic service area log-in which is transmitted to the home service area. The cordless telephone begins to search for a CT-2 call point signal 1210, and when a call point signal is not detected, the search continues 1210. Upon detecting a call point signal, the cordless telephone determines if the call point is within range 1212. Once the call point is determined to be within range, the call system terminal enters the unit identification and the home system code. This enables the new location identifier to be transferred to the home system to enable the home system to reroute all pages and download location specific information for the pager/cordless telephone transceiver to the service area where it is currently located.

The preferred embodiment of the present invention operates automatically and is transparent to the user. The location identifier is received and stored by the paging system. When the user is within range of a cordless telephone call point station 702, the message processor 820 signals the telephone control logic (controller) 830 (FIG. 8) to call up the home paging controller 714 (FIG. 7) to transfer the new location identifier of the pager/cordless telephone transceiver 720. The location identifier is retrieved and transmitted by the cordless telephone transceiver portion 720 to the home service area to enable automatic page transfer and downloading of location specific information. Before the location specific information is downloaded to the selective call receiver 108 or the pager/cordless telephone 720, the paging systems compares the signal received with a list of authorized receivers to determine if the selective call receiver 108 or the pager/cordless telephone 720 is authorized to receive the location specific information.

By now it should be appreciated that there has been provided a communication system to provide improved paging throughput by allowing the home paging to log the service areas of the roaming selective call receiver to enable the paging system to reroute incoming pages and any location specific information without undue burden on the paging system's signal capacity. The paging system provides normal paging operations and delivers messages to the pagers located within its home service area while the acknowledge-back portion of the selective call receiver or cordless telephone link is used to inform the home service area when the selective call receiver or pager/cordless telephone is roaming. The home service area downloads location specific information and reroutes all pages to the selective call receiver in the new service area.

In summary, in one form of the invention, there is provided a selective call system that has a plurality of base sites for communicating with a plurality of selective call receivers with acknowledge-back capabilities. At least one of the plurality of selective call receivers has a location identifier for enabling operation over a wide geographic area. A method for communicating comprises the steps of: (a) transmitting selective call signals encoded with a location identifier associated with a service area of a base site transmitting same; (b) comparing the location identifier received with the location identifier of a selective call receiver to determine when the selective call receiver has roamed to a new service area; (c) logging-in to the new service area when the selective call receiver determines that the location identifier received comprises a new location identifier; (d) sending the new location identifier to a home service area of the selective call receiver for enabling paging information to be routed to the selective call receiver from the home service area. The step of sending further comprises the step of requesting that requests the base site at the home service area to download location specific information corresponding to the new location identifier to the selective call receiver at the new service area. The method further comprises the steps of: (d1) storing the location specific information and a list of selective call receivers authorized to receive the location specific information at the new service area and storing subscriber location specific information at a home service area, (d2) categorizing the location specific information according to the location identifier of the service area, (d3) accessing the location specific information in response to the location identifier transmitted by the selective call receiver to the base site at the home service area, and (e) downloading the location specific information in response to verifying that the selective call receiver is authorized to receive the location specific information. The step of downloading includes downloading general location specific information from the new service area and downloading subscriber location specific information from the home service area.

What is claimed is:

1. In a selective call system having a plurality of base sites for communicating with a plurality of selective call receivers having acknowledge-back capability wherein at least one of the plurality of selective call receivers having a stored location identifier identifying a home service area for enabling operation over a wide geographic area, a method for communicating comprising the steps of:

(a) transmitting selective call signals having a location identifier associated with a service area of a base site transmitting the same;

(a1) receiving the selective call signals transmitted from the base site by a selective call receiver;

(b) comparing the location identifier received with the stored location identifier to enable the selective call receiver to determine when it has roamed to a new service area;

(c) logging-in to the new service area when the selective call receiver determines that the location identifier received comprises a new location identifier;

(d) sending the new location identifier and address identifying the selective call receiver to the home service area for enabling paging messages to be routed from the home service area to the selective call receiver in the new service area;

(e) recovering subscriber location specific information which is previously provided by the user of the selective call receiver and stored in the home service area;

(f) sending the subscriber location specific information recovered in the home service area to the base site in the new service area; and (g) downloading the subscriber location specific information to the selective call receiver from the base site in the new service area.

2. The method according to claim 1 wherein the step of downloading further comprises the step of verifying that the selective call receiver is authorized to receive general location specific information in the new service area.

3. The method according to claim 2 further comprising the steps of:

storing the general location specific information in the home service area, and the subscriber location specific information relating to a plurality of service areas in the home service area;

categorizing the subscriber location specific information according to the location identifier of each service area; and accessing the subscriber location specific information in response to the location identifier received from the selective call receiver the home service area.

4. The method according to claim 2 further comprising the steps of:

storing the general location specific information and a list of selective call receivers authorized to receive the general location specific information at the new service area; and retrieving the general location specific information when the selective call receiver is authorized to received same.

5. A selective call system having a plurality of base sites for communicating with a plurality of selective call receivers having acknowledge-back capability wherein at least one of the plurality of selective call receivers having a stored location identifier identifying a home service area for enabling operation over a wide geographic area the selective call system comprising:

a base site comprising:

a base site transmitter for transmitting selective call signals encoded with a location identifier identifying a service area of the base site transmitter, a base site receiver for receiving acknowledge-back signals in response to the selective call signals being transmitted, a memory for storing subscriber location specific information previously provided by the user of a selective call receiver, and a controller, coupled to the base site transmitter and the base site receiver, for recovering the subscriber location specific information which is previously provided by the user of the selective call receiver, and for sending the same to a base station identified in a new service area in response to receiving a new location identifier for a new service area and an address identifying the selective call receiver located within the new service area, wherein the base site transmitter, in the new service area, downloads the subscriber location specific information received from the base site in the home service area to the selective call receiver; and the selective call receiver, comprising:

a receiver for receiving the selective call signals including the location identifier and the subscriber location specific information received in the new service area, a decoder/controller, coupled to the receiver, for comparing the location identifier received with the stored location identifier of selective call receiver to determine when the selective call receiver has roamed to the new service area, a memory, coupled to the decoder/controller, for storing the location identifier for logging-in to the new service area when the location identifier received comprises the new location identifier, and an acknowledge-back transmitter, coupled to the decoder/controller, for transmitting the new location identifier received and an address identifying the selective call receiver for enabling paging information to be routed from the home service area to the selective call receiver in the new service area.

6. The selective call system according to claim 5 wherein the decoder/controller encodes a signal for requesting the base site in the home service area to download the subscriber location specific information to the new service area, and the acknowledge-back transmitter transmits the signal which is received by the base site receiver in the new service area and forwarded to the base site in the home service area.

7. The selective call system according to claim 6 wherein the memory is categorized for storing the subscriber location specific information according to the location identifier of the new service area, and the controller in the new service area, accesses the subscriber location specific information from the home service area in response to the location identifier being transmitted by the selective call receiver.

8. The selective call system according to claim 6 further comprising:
   a memory for storing general location specific information and a list of selective call receivers authorized to receive the general location specific information in the new service area; and
   retriever for retrieving the general location specific information when the selective call receiver is authorized to received the general location specific information.

9. The selective call system according to claim 8 wherein the memory is categorized according to the location identifier for storing the subscriber location specific information and the general location specific information, wherein the general location specific information is stored at the new service area and the subscriber location specific information is stored at the home service area.

10. The selective call system according to claim 9 wherein the general location specific information comprises information relating to local telephone directory, restaurants and hotels at the new service area.

11. The selective call system according to claim 9 wherein the subscriber location specific information comprising information relating to client lists, personal and confidential information of a subscriber.

12. A selective call receiver having acknowledge-back capabilities and a stored location identifier identifying a home service area for enabling operation over a wide geographic area, comprising:
   a receiver for receiving selective call signals encoded with a location identifier indicative of a service area of a base site transmitting same;
   a decoder/controller, coupled to the receiver, for comparing the location identifier received with the stored location identifier of the selective call receiver to enable the selective call receiver to determine when the selective call receiver has roamed to a new service area;
   a memory, coupled to the decoder/controller, for storing the location identifier received for enabling operation in the new service area when the location identifier received comprises a new location identifier;
   an acknowledge-back transmitter, coupled to the decoder/controller, for transmitting the new location identifier received and an address identifying the selective call receiver for enabling paging information and subscriber location specific information previously provided by the user of the selective call receiver and stored in the home service area to be routed from the home service area to the selective call receiver at the new service area; and
   the receiver, in response to the acknowledge-back transmitter transmitting the new location identifier, receives the subscriber location specific information downloaded from the new service area for enabling efficient operation of the selective call receiver in the new service area.

13. The selective call receiver according to claim 12 wherein:
   the decoder/controller encodes a signal for requesting the home service area to download the subscriber location specific information to a base station located the new service area;
   the acknowledge-back transmitter transmits the signal which is received by a base site receiver in the new service area and forwarded to the base station at the home service area; and
   the receiver receives the subscriber location specific information downloaded to the base site at the home service area.

14. The selective call receiver according to claim 12 wherein:
   the decoder/controller encodes a signal for requesting a download of the subscriber location specific information;
   the acknowledge-back transmitter transmits the signal to the base site in the new service area; and
   the receiver receives the subscriber location specific information downloaded by the base site at the new service area.

15. In a communication system having a combination selective call communication system and cordless telephone communication system for communicating with a portable communicator comprising a combination of a cordless telephone and a selective call receiver, the portable communicator has a stored location identifier identifying a home service area for enabling operation over a wide geographic area, a method for communicating comprising the steps of:
   (a) transmitting selective call signals having a location identifier associated with a service area of a base site transmitting the same;
   (a1) receiving the selective call signals transmitted from the base site by the selective call receiver;
   (b) comparing the location identifier received with the stored location identifier of the selective call receiver of the portable communicator to enable the portable communicator to determine when it has roamed to a new service area;
   (c) logging-in to the new service area with the cordless telephone when the portable communicator determines that the location identifier received comprises a new location identifier;
   (d) sending the new location identifier and address identifying by the cordless telephone to a home service area of the portable communicator for enabling selective call messages to be routed to the portable communicator in the new service area from the home service area;
   (e) recovering subscriber location specific information which is previously provided by the user of the selective call receiver and stored in the home service area;
   (e1) sending the subscriber location specific information recovered in the home service area to the base site in the new service area; and
   (f) downloading the subscriber location specific information to the portable communicator from the base site in the new service area.

16. The method according to claim 15 wherein the step (d) of sending the new location identifier further comprises the step of requesting the base site at the home service area to download the subscriber location specific information corresponding to the new location identifier to the portable communicator at the new service area.

17. The method according to claim 15 further comprising the steps of:
   storing the subscriber location specific information at the home service area, the subscriber location specific information relating to a plurality of service areas;
   categorizing the subscriber location specific information according to the location identifier of each service area; and
   accessing the subscriber location specific information in response to the location identifier being transmitted by the cordless telephone to the base site at the home service area.

18. The method according to claim 15 further comprising the steps of:

storing general location specific information and a list of portable communicators authorized to receive the general location specific information at the new service area; and retrieving the general location specific information when the portable communicator is authorized to received the general location specific information.

19. A communication system having a combination selective call communication system and cordless telephone communication system for communicating with a portable communicator comprising a combination of a cordless telephone and a selective call receiver, the portable communicator has a stored location identifier identify a home service area for enabling operation over a wide geographic area, the communication system comprising:

a base site transmitter for transmitting selective call signals encoded with a location identifier identifying a service area of the base site transmitter;

a base site receiver for receiving cordless telephone signals in response to the selective call signals being transmitted;

a memory for storing subscriber location specific information previously provided by the user of a selective call receiver, a controller, coupled to the base site transmitter and the base site receiver, for recovering the subscriber location specific information previously provided by the user of the selective call receiver, and for sending, the same to a base station identified in a new service area in response to receiving a new location identifier for a new service area and an address identifying the selective call receiver located within the new service area;

the base site transmitter, in the new service area, downloads the subscriber location specific information received from the base station in the home service area to the portable communicator the portable communicator, comprising:

the selective call receiver for receiving the selective call signals including the location identifier and the subscriber location specific information received in the new service area;

a decoder/controller, coupled to the selective call receiver, for comparing the location identifier received with the stored location identifier stored in the portable communicator to determine when the portable communicator has roamed to the new service area;

a first memory, coupled to the decoder/controller, for storing the location identifier for logging-in to the new service area when the location identifier received comprises the new location identifier; and the cordless telephone, coupled to the decoder/controller, for transmitting the new location identifier received and an address identifying the portable communicator for enabling selective call information to be routed from the home service area to the portable communicator at the new service area.

20. The communication system according to claim 19 wherein the decoder/controller encodes a signal for requesting a base site at the home service area to download the subscriber location specific information to the portable communicator at the new service area; and the cordless telephone transmits the signal which is received and forwarded by the base site of the new service area to home service area of the portable communicator.

21. The communication system according to claim 19 further comprising a base site comprising:

a second memory for storing subscriber location specific information at the home service area of the portable communicator for a plurality of service areas, wherein the second memory is categorized for storing the subscriber location specific information according to the location identifier of the service area; and the controller accesses the subscriber location specific information in response to the location identifier being transmitted by the portable communicator to the base site at the home service area.

22. The communication system according to claim 19 further comprising:

a third memory for storing general location specific information and a list of portable communicators authorized to receive the general location specific information at the new service area; and retriever for retrieving the general location specific information when the portable communicator is authorized to received the general location specific information.

23. The communication system according to claim 22 wherein the third memory is categorized according to the location identifier for storing the general location specific information wherein general location specific information is stored at the new service area and subscriber location specific information is stored at the home service area.

24. The communication system according to claim 23 wherein the general location specific information comprise information relating to local telephone directory, restaurants and hotels at the service area.

25. The communication system according to claim 23 wherein the subscriber location specific information comprises information relating to client lists, personal and confidential information of a subscriber.

26. A portable communicator comprising a selective call receiver and a cordless telephone having a stored location identifier identifying a home service area for enabling operation over a wide geographic area, comprising:

the selective call receiver for receiving selective call signals encoded with a location identifier indicative of a service area of a base site transmitting same;

a message processor for comparing the location identifier received with the stored location identifier of the portable communicator to determine when the portable communicator has roamed to a new service area;

a memory, coupled to the message processor, for storing the location identifier received for enabling operation in the new service area when the location identifier received comprises a new location identifier;

a cordless telephone transceiver, coupled to the message processor, for transmitting the new location identifier received and an address identifying the selective call receiver for enabling paging information and subscriber location specific information previously provided by the user of the selective call receiver and stored in the home service area to be routed from the home service area to the portable communicator at the new service area; and a receiver, coupled to the memory, for receiving the subscriber location specific information downloaded from a base site of the new service area to enable the portable communicator operate in the new service area.

27. The portable the message according to claim 26 wherein:

the message processor encodes a signal for requesting the home service area to download the subscriber location specific information to the new service area;

the cordless telephone transceiver transmits the signal which is received and forwarded to the base site at the home service area; and the receiver receives the subscriber location specific information downloaded by the base site at the home service area.

28. The selective call receiver according to claim 26 wherein:

the message processor encodes a signal for requesting a download of the subscriber location specific information;

the cordless telephone transceiver transmits the signal to a base site in the new service area; and the receiver receives the subscriber location specific information downloaded by the base site at the new service area.

29. In a selective call system having a plurality of base sites for communicating with a plurality of selective call receivers having acknowledge-back capabilities wherein at least one of the plurality of selective call receivers having a stored location identifier identifying a home service area for enabling operation over a wide geographic area, a method for communicating comprising the steps of:

(a) transmitting selective call signals having the location identifier associated with a service area of a base site transmitting the same;

(a1) receiving the selective call signals transmitted from the base site by a selective call receiver;

(b) comparing the location identifier received with the stored location identifier of the selective call receiver to enable the selective call receiver to determine when it has roamed to a new service area;

(c) logging-in to the new service area when the selective call receiver determines that the location identifier received comprises a new location identifier;

(d) sending the new location identifier and address identifying the selective call receiver to the home service area for enabling paging messages to be routed from the home service area to the selective call receiver in the new service area, the step of sending further comprises a step of requesting the base site at the home service area to download subscriber location specific information corresponding to the new location identifier to the selective call receiver at the new service area;

(d1) storing general location specific information and a list of selective call receivers authorized to receive the general location specific information at the new service area and storing subscriber location specific information at a home service area;

(d2) categorizing the subscriber location specific information according to the location identifier of the service area;

(d3) accessing the subscriber location specific information in response to the location identifier being transmitted by the selective call receiver to the base site at the home service area; and (e) downloading the subscriber location specific information to the selective call receiver from the base site in the new service area, the step of downloading includes downloading general location specific information from the new service area to the selective call receiver authorized to receive the general location specific information.

* * * * *